United States Patent Office 3,467,682
Patented Sept. 16, 1969

3,467,682
13β-ALKYL-17α-ALKYNYLGON-4-ENE-3β,17β-DIOLS AND ESTERS CORRESPONDING
Paul D. Klimstra, Northbrook, Ill., assignor to G. D. Searle & Co., Chicago, Ill., a corporation of Delaware
No Drawing. Continuation-in-part of application Ser. No. 491,446, Sept. 29, 1965. This application Apr. 28, 1967, Ser. No. 634,452
Int. Cl. C07c 169/12, 169/08; A06k 17/06
U.S. Cl. 260—397.5                    2 Claims

ABSTRACT OF THE DISCLOSURE

Novel steroidal derivatives characterized by a 13β-alkyl substituent in which the alkyl group contains at least two carbon atoms, useful as pharmacological agents, e.g. progestational, estrogenic, anti-estrogenic, pepsin inhibitory, anti-algal and anti-protozoal, and preparable by Birch reduction of a 13β-alkyl-3-(lower alkoxy)gona-1,3,5(10)-trien-17-one followed by oxidation of the 17-hydroxy function, alkynylation of the resulting 17-keto group, hydrolysis of the enol ether function, reduction of the resulting 3-keto substitutent and, optionally, esterification of either one or both of the 3- and 17-hydroxy groups.

This application is a continuation-in-part of my copending application Ser. No. 491,446, filed Sept. 29, 1965 now abandoned.

The present invention is concerned with novel steroidal derivatives characterized by a 13β-alkyl substituent in which that alkyl group contains at least two carbon atoms and, more particularly, with 17α-alkynyl-13β-alkylgon-4-ene-3β,17β-diols and esters thereof represented by the following structural formula

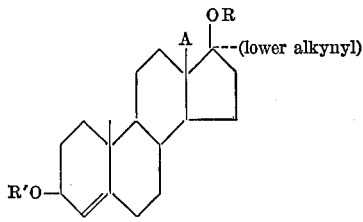

wherein R and R' can be hydrogen or a lower alkanoyl radical and A is a lower alkyl radical containing at least two carbon atoms.

The lower alkanoyl radicals encompassed by the R and R' terms are exemplified by formyl, acetyl, propionyl, butyryl, valeryl, caproyl, heptanoyl, and the branched-chain groups isomeric therewith.

Illustrative of the lower alkyl radicals denoted by the term A in the foregoing structural representation are ethyl, propyl, butyl, pentyl, hexyl, heptyl and the branched-chain isomers thereof.

Starting materials suitable for utilization in the manufacture of the instant compounds are the 13β-alkylgona-1,3,5(10)-trien-17-ones of the following structural formula

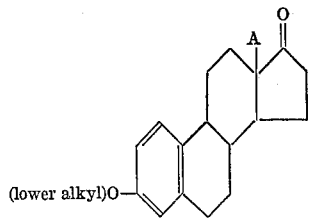

wherein A is as hereinbefore defined. As a specific example dl-13β-ethyl-3-methoxygona-1,3,5(10)-trien-17-one is partially reduced by reaction with sodium and liquid ammonia in tetrahydrofuran to afford dl-13β-ethyl-3-methoxygona-2,5(10)-dien-17β-ol. Oxidation of the 17-hydroxy function is conveniently effected by means of aluminum isopropoxide and cyclohexanone in toluene to afford dl-13β-ethyl-3-methoxygona-2,5(10)-dien-17-one. Hydrolysis of that enol ether by heating with hydrochloric acid in methanol results in dl-13β-ethylgon-4-ene-3,17-dione while alkynylation of the 17-keto group affords the corresponding 17-alkynyl-17β-hydroxy substances. Reaction with lithium acetylide in the form of the ethylene diamine complex thus produces dl - 13β - ethyl - 17α-ethynyl-3-methoxygona-2,5(10)-dien-17β-ol. Hydrolysis of the latter enol ether, suitably with hydrochloric acid in methanol, affords dl-13β-ethyl-17α-ethynyl-17β-hydroxygon-4-en-3-one which is contacted with a suitable reducing agent such as lithium tri-(tertiary-butoxy) aluminum hydride, preferably in the presence of an organic solvent such as tetrahydrofuran, to produce dl-13β-ethyl-17α-ethynylgon-4-ene-3β,17β-diol.

When the instant 3β,17β-diols are contacted with a lower alkanoic acid anhydride or halide, preferably in the presence of a suitable acid acceptor, the corresponding 3,17-bis-(lower alkanoates) and 3-mono-(lower alkanoates) are produced. A specific illustration is the reaction of dl-13β-ethyl-17α-ethynylgon-4-ene-3β,17β-diol with acetic anhydride and pyridine to afford the corresponding 3,17-diacetate and 3-acetate, which are separated chromatographically.

A convenient procedure for manufacture of the instant 17-mono-(lower alkanoates) utilizes as starting materials the aforementioned 17α-alkynyl-13β-alkyl-3-(lower alkoxy)gona-2,5(10)-dien-17β-ols. Typically, dl-13β-ethyl-17α-ethynyl-3-methoxygona-2,5(10)-dien-17β-ol is hydrolyzed by heating with hydrochloric acid in methanol to afford dl - 13β - ethyl-17α-ethynyl-17β-hydroxygon-4-en-3-one. Acylation of the 17-hydroxy group by heating with acetic anhydride and pyridine results in the corresponding 17-acetate which is allowed to react with lithium tri-(tertiary-butoxy)aluminum hydride in tetrahydrofuran to afford the desired dl-13β-ethyl-17α-ethynylgon-4-ene-3β,17β-diol 17-acetate.

The compounds of this invention, as obtained by the procedures described hereinbefore, exist as dl-mixtures. It will be apparent to those skilled in the art that the optically active d and l forms can be separated from those mixtures by standard resolution techniques. Typically, the instant diols are converted to an acid ester by reaction with a dibasic acid anhydride, such as succinic or phthalic anhydride, and those acid esters are resolved by reaction with an optically active amine such as brucine, morphine, quinidine, quinine, strychnine, etc.

The compounds of the present invention are useful in view of their valuable pharmacological properties. They are potent progestational agents, for example, in consequence of their ability to proliferate the uterine endometrium. They exhibit also hormonal and anti-hormonal properties as is evidenced by their estrogenic and anti-estrogenic activity. They are, moreover, pepsin-inhibitory agents. Those compounds characterized by a 17-(lower alkanoyl)oxy function are distinguished by their especially potent estrogenic properties. In addition, the compounds lacking a 17-(lower alkanoyl)oxy substituent exhibit anti-algal and anti-protozoal activity in view of their ability to inhibit the growth of such organisms as *Chlorella vulgaris* and *Tetrahymena gelleii*.

The instant compounds can be administered in any of a number of conventional pharmaceutical forms and also by conventional routes. For oral administration suitable solid forms are pills, powders, capsules, tablets, or the like, and suitable liquid forms are syrups, emulsions, elixirs, suspensions and the like. For parenteral administration these compounds can be dispersed in an aqueous suspension or dissolved in a pharmacologically acceptable oil or oil-water emulsion. Suitable excipients can also be added.

The pharmacological activity of the novel compounds of this invention is specifically illustrated by the estrogenic response produced in immature female mice injected subcutaneously with corn oil solutions of dl-13β-ethyl-17α-ethynygon-4-ene-3β,17β-diol 3,17- diacetate over a period of 3 days at total doses varying between 0.01 and 1.0 mg. per mouse. As compared to the standard, i.e. subcutaneously administered estrone, this compound possesses a potency of 2.1%.

The invention will appear more fully from the examples which follow. These examples are given by way of illustration only and are not to be construed as limiting the invention either in spirit or in scope as many modifications both in materials and methods will be apparent from this disclosure to those skilled in the art. In the following examples, temperatures are given in degrees centgrade (° C.) and quantities of materials in parts by weight unless otherwise noted.

EXAMPLE 1

To a solution of 351 parts of tertiary-butyl alcohol in 630 parts of liquid ammonia is added, at —70°, a solution of dl-13β-ethyl-3-methoxygona-1,3,5(10) - trien - 17-one in 405 parts of tetrahydrofuran. The resulting mixture is stirred vigorously; then 33 parts of sodium metal is added portionwise over a period of about 45 minutes. After stirring for about 2 hours, 120 parts of methanol is added to the blue reaction mixture, and the resulting solution is stirred and the ammonia evaporated. The resulting residue is poured carefully into approximately 6,000 parts of water, and the product which precipitates is collected by filtration, washed on the filter with water and dried in air, thus affording dl-13β-ethyl-3-methoxygona-2,5(10)-dien-17β-ol, characterized by an ultraviolet absorption maximum at about 240 millimicrons with a molecular extinction coefficient of about 12,000.

EXAMPLE 2

A solution of 28 parts of dl-13β-ethyl-3-methoxygona-2,5(10)-dien-17β-ol in 435 parts of toluene is azeotropically distilled in order to remove moisture, following which time 57 parts of cyclohexanone and a solution of 12 parts of aluminum isopropoxide in 130 parts of toluene are successively added to the hot solution. The resulting reaction mixture is heated at the reflux temperature for about 75 minutes, and 26 parts of sodium potassium tartrate dissolved in 100 parts of hot water is added. The mixture is steam distilled in order to remove organic solvent, and the residual solution is diluted with water to effect precipitation of the product. The resulting material is washed with water and dried in air to yield dl-13β-ethyl-3-methoxygona-2,5(10)-dien-17-one, which exhibits an ultraviolet obsorption maximum at about 240 millimicrons with a molecular extinction coefficient of about 13,000.

EXAMPLE 3

To a solution of 8 parts of dl-13β-ethyl-3-methoxygona-2,5(10)-dien-17-one in 80 parts of methanol is added a solution of 12 parts of concentrated hydrochloric acid in 6 parts of water, and that reaction mixture is heated at the reflux temperature for about one hour, then is filtered through diatomaceous earth and diluted with water. The resulting precipitate is collected by filtration, washed with water and dried in air to yield the crude product. Purification by adsorption on silica gel followed by elution with 15% ethyl acetate in benzene affords pure dl-13β-ethylgon-4-ene-3,17-dione, melting at about 158–160° and exhibiting an ultraviolet absorption maximum at about 239 millimicrons with a molecular extinction coefficient of about 16,500.

EXAMPLE 4

To a solution of 8.5 parts of dl-13β-ethyl-3-methoxygona-2,5(10)-dien-17-one in 225 parts of tetrahydrofuran, under nitrogen, is added, with stirring, 20 parts of the 30% lithium acetylide-ethylene diamine complex. That reaction mixture is stirred at room temperature for about 40 hours, then is poured into excess saturated aqueous ammonium chloride. Extraction of that mixture with ether affords an organic solution which is washed with water, dried over anhydrous sodium sulfate containing decolorizing carbon and concentrated to dryness under pressure. The resulting gummy solid residue containing dl-13β-ethyl-17α-ethynyl-3-methoxygona-2,5(10)-dien - 17β-ol is dissolved in 120 parts of methanol, and 12 parts of concentrated hydrochloric acid dissolved in 7 parts of water is added. That mixture is heated at the reflux temperature for about 40 minutes, then is cooled and poured carefully into water. Extraction with ether affords an organic solution which is washed successively with water and 5% aqueous sodium bicarbonate, then is dried over anhydrous sodium sulfate containing decolorizing carbon. Distillation of the solvent under reduced pressure affords an oily residue which is purified by adsorption on a silica gel chromatographic column followed by elution with 10% ethyl acetate in benzene to yield dl-13β-ethyl-17α-ethynyl-17β-hydroxygon-4-en-3-one.

EXAMPLE 5

To a solution of 1.6 parts of dl-13β-ethyl-17α-ethynyl-17β-hydroxygon-4-en-3-one in 58 parts of tetrahydrofuran is added, with stirring at 0–5°, 5 parts of lithium tri-(tertiary-butoxy)aluminum hydride. The resulting solution is stirred for about 2 hours, during which time the mixture is allowed to warm to room temperature. Dilution with approximately 250 parts of cold water containing 31.5 parts of acetic acid affords an acidic mixture, which is extracted with ether. The ether layer is separated, washed successively with water and 5% aqueous sodium bicarbonate, then dried over anhydrous potassium carbonate containing decolorizing carbon. Removal of the solvent by distillation under reduced pressure affords a glass-like residue, which is purified by recrystallization from aqueous methanol to afford dl-13β-ethyl-17α-ethynylgon-4-ene-3β,17β-diol monohydrate, melting at about 108–110°. This compound can be represented by the following structural formula

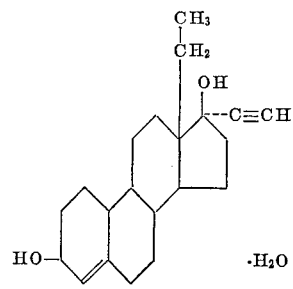

EXAMPLE 6

A solution containing one part of dl-13β-ethyl-17α-ethynylgon-4-ene-3β,17β-diol, 6 parts of acetic anhydride and 12 parts of pyridine is heated at the reflux temperature for about 12 hours, then is cooled and poured carefully into a mixture of ice and water. The resulting precipitate is collected by filtration, then is washed with water and dried in air. The resulting solid material is then adsorbed on silica gel and eluted with 5% ethyl acetate in benzene to afford, as the less polar product, dl-13β-ethyl-17α-ethynylgon-4-ene - 3β,17β - diol 3,17-diacetate, characterized by infrared absorption maxima, in chloroform, at about 3.03, 3.40, 5.73–5.77, 6.0, 7.29, 7.93, 9.59 and 9.74 microns, and, as the more polar substance, dl-13β-ethyl-17α-ethynylgon - 4 - ene-3β,17β-diol 3-acetate, which displays infrared absorption maxima, in chloroform, at about 2.74, 3.01, 3.38, 5.75, 5.98, 7.28 and 7.92 microns.

EXAMPLE 7

A mixture of one part of dl-13β-ethyl-17α-ethynyl-17β-hydroxygon-4-en-3-one, 10 parts of acetic anhydride and 20 parts of pyridine is heated at 90–100° for about 4 hours, then is carefully diluted with water. The resulting aqueous mixture is extracted with benzene, and the benzene solution is separated, washed with water, dried over anhydrous sodium sulfate and evaporated to dryness to afford dl-17β-acetoxy-13β-ethyl-17α-'ethynylgon - 4-en-3-one.

The reduction of an equivalent quantity of dl-17β-acetoxy-13β-ethyl-17α-'ethynylgon-4-en-3-one by the procedure described in Example 5 results in dl-13β-ethyl-17α-ethynylgon-4-ene-3β,17β-diol 17-acetate, characterized by structural formula

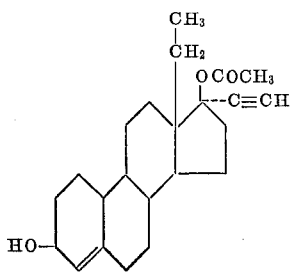

EXAMPLE 8

When an equivalent quantity of the lithium butynilide-ethylene diamine complex is substituted in the procedure of Example 4, there are obtained dl-17α-butynyl-13β-ethyl-3-methoxygona-2,5(10)-diene-17β-ol and dl-17α-butynyl-13β-ethyl-17β-hydroxygon-4-en-3-one.

The substitution of an equivalent quantity of dl-17α-butynyl-13β-ethyl-17β-hydroxygon-4-en-3-one in the procedure of Example 5 results in dl-17α-butynyl-13β-ethyl-gon-4-ene-3β,17β-diol.

EXAMPLE 9

The reaction of equivalent quantities of dl-17α-butynyl-13β-ethylgon-4-ene-3β,17β-diol with propionic anhydride by the procedure described in Example 6 results in dl-17α-butynyl-13β-ethylgon-4-ene - 3β,17β-diol 3,17-dipropionate and dl-17α-butynyl-13β-ethylgon-4-ene-3β,17β-diol 3-propionate.

EXAMPLE 10

When an equivalent quantity of dl-17α-butynyl-13β-ethyl-3-methoxygona-2,5(10)-dien-17β-ol is substituted in the procedure of Example 3, there is obtained dl-17α-butynyl-13β-ethyl-17β-hydroxygon-4-en-3-one.

The reaction of equivalent quantities of dl-17α-butynyl-13β-ethyl-17β-hydroxygon-4-en-3-one and propionic anhydride by the acylation procedure described in Example 7 results in dl-17α-butynyl-13β-ethyl-17β-propionoxygon-4-en-3-one.

When an equivalent quantity of dl-17α-butynyl-13β-ethyl-17β-propionoxygon-4-en-3-one is reduced by the procedure described in Example 5, there is obtained dl-17α-butynyl-13β-ethylgon-4-ene-3β,17β-diol 17-propionate.

What is claimed is:

1. A compound of the formula

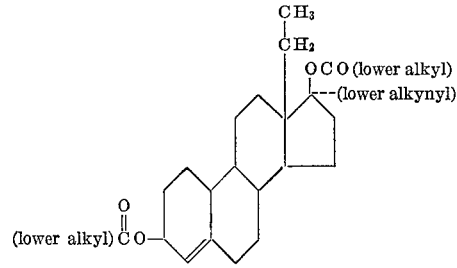

2. As in claim 1, the compound which is 13β-ethyl-17-ethynylgon-4-ene-3β,17β-diol 3,17-diacetate.

No references cited.

HENRY A. FRENCH, Primary Examiner

U.S. Cl. X.R.

260—397.3, 397.4, 999